United States Patent Office 2,875,068
Patented Feb. 24, 1959

2,875,068
CURING OF MEATS
Samuel Klein, Newark, N. J.
No Drawing. Application October 28, 1957
Serial No. 692,982
15 Claims. (Cl. 99—159)

This invention is directed to a method and composition for curing meats and to a method for producing said composition.

This application is a continuation-in-part of application Serial No. 485,348, filed January 31, 1955, now abandoned.

In one aspect of the present invention there is provided a composition for curing meats which not only accelerates the cure but provides the resultant cured meat product with enhanced flavor, pronounced aroma, improved color and greatly extended keeping quality during storage, distribution and display.

More particularly, there is provided an additive composition which is to be used with conventional nitrite-nitrate pickling solutions, said additive preferably comprising mono-sodium glutamate, ascorbic acid and sodium bicarbonate.

This additive when added to conventional nitrite-nitrate pickling solutions, acts as a booster and results in shortened curing time, which in turn reduces the shrinking of the meat caused by excess water loss. By utilizing the common pickling solution to which has been added the additive of the present invention, a satisfactory meat cure can be obtained in as little as 12 hours.

Furthermore, by utilizing the composition of the present invention, there is provided a method of curing meats which reduces operational control problems by eliminating the need for excess curing ingredients as required by conventional prior art nitrite-nitrate processes.

In the prior art processes these excess ingredients, usually salts, result in the too rapid release of nitric oxide gas. This rapid release of nitric oxide gas causes "nitrite" meat burns. This rapid release of gas is frequently caused by the rapid interaction of the nitrites and nitrates with the ascorbic acid which is used to accelerate the curing of meat.

In addition, according to the present invention, there is created during the curing of the meat an environment having a reduced oxygen content and this results in the meat having a better color.

When the additive composition is added to or dissolved in the conventional nitrite-nitrate pickling solution, carbon dioxide is liberated and this liberated carbon dioxide displaces the oxygen in the solution and in the meat tissue.

This removal or elimination of oxygen enhances the anti-oxidant action of the ascorbic ion by reducing the oxygen supply which normally rapidly reacts with the ascorbic ion.

The carbon dioxide which displaces the oxygen results from the reaction of the bicarbonate with the other ingredients of the pickling solution and particularly from the neutralizing reaction between the bicarbonate and the ascorbic acid.

Furthermore, the glutamate in the composition of the present invention serves a multiple function. Not only does the glutamate eliminate an undesirable medicinal after-taste which would be present if the glutamate were not used, but the glutamate also produces a synergistic effect with the other ingredients and thereby hastens the cure of the meat, and enhances the keeping qualities of the meats.

This synergistic effect results from the amine content of the glutamate which further protects the labile ascorbic acid from oxidation and thereby results in a more complete and rapid cure than would result in the absence of the glutamate.

Moreover, in the prior art processes where ascorbic acid has been added to the pickling composition, special equipment had to be employed in order to prevent the rapid reaction between the nitrite and the ascorbic acid which resulted in meat "burns," due to the too rapid release of nitric oxide gas. This gas is also a health hazard to workers. By the present invention, the ascorbic acid is added in a simple manner which avoids this rapid reaction and the too rapid release of nitric oxide gas.

As hereinafter described, the additive is preferably added to the conventional pickling solution in a manner to avoid immediate reaction between the additive and the other ingredients of the conventional nitrite-nitrate pickling solutions. This is accomplished by adding the additive in the form of a solid compacted mass of the communited ingredients or in the form of a packet comprising the comminuted ingredients of the additive enclosed in a cloth bag. In this manner, the bulk of the additive is isolated from the bulk of the remainder of the pickling solution and the ingredients of the additive and the solution slowly interact in a controlled manner.

Addition in this manner also simplifies the problem of weighing, measuring and mixing since the packet or compacted mass may be supplied in any desirable unit weight.

In another aspect of the present invention, there is provided a method of making the additive composition. More particularly, the ingredients of the additive are reduced to a state of fine division by levigating the solid ingredients with acetone, preferably at a temperature not exceeding 25° C. The levigated ingredients are dried under reduced pressure at a temperature not exceeding 50° C.

According to the present invention, the additive preferably comprises ascorbic acid, alkali metal bicarbonate and alkali metal glutamate, the ratio of alkali metal glutamate to ascorbic acid being about 1.2–8 parts by weight of the glutamate calculated as mono-sodium glutamate to 1 part of ascorbic acid, the alkali metal bicarbonate and ascorbic acid being in equimolar proportions.

More specifically, with 100 gallons of conventional nitrite-nitrate pickling solution there is used an additive comprising about 94–189 grams of ascorbic acid, 45–91 grams of alkali metal bicarbonate calculated as sodium bicarbonate and 224–740 grams of alkali metal glutamate calculated as mono-sodium glutamate.

In each of the following specific examples of the additive composition, the additive is prepared and used in the manner described hereinafter.

EXAMPLE 1

This is an example of the additive of the present invention which may be used with pump or cover pickle for curing ham, bacon, beef or with a pickle containing a dry spice mixture. With 100 gallons of conventional nitrite-nitrate pickle there may be used an additive containing the following ingredients:

| | Grams |
|---|---|
| Ascorbic acid | 188.5 |
| Sodium bicarbonate | 90.2 |
| Mono-sodium glutamate | 740 |
| Total | 1018.7 |

EXAMPLE 2

The additive may contain, in addition to the ascorbic acid, sodium bicarbonate and mono-sodium glutamate, other ingredients which do not affect the basic character of the additive. The following composition may be used with a pump or cover pickle for the same meats specified in Example 1:

| | Grams |
|---|---|
| Ascorbic acid | 188.5 |
| Sodium bicarbonate | 90.2 |
| Mono-sodium glutamate | 370 |
| Anhydrous sodium chloride | 370 |
| Total | 1018.7 |

When the compositions of Examples 1 and 2 are dissolved in the pickle solution, there will be created in the 100 gallons of the solution 7½ oz. of freshly prepared sodium ascorbate and approximately 46 grams (23 liters) of carbon dioxide which is necessary to produce the desired effect of appreciably reducing the oxygen during the curing of the meat.

In Example 1, the ratio of glutamate to ascorbic acid is approximately 4 to 1. In Example 2, the ratio of glutamate and of sodium chloride to ascorbic acid is approximately 2 to 1.

EXAMPLE 3

This example illustrates the minimum desirable amount of glutamate which is to be used with 100 gallons of conventional pickling composition in order to eliminate the medicinal after-taste imparted to the finished cured meat which is otherwise present. This minimum quantity of glutamate is also necessary to adequately protect the ascorbic acid from oxidation.

| | Grams |
|---|---|
| Ascorbic acid | 188.5 |
| Sodium bicarbonate | 90.2 |
| Mono-sodium glutamate | 224.6 |
| Total | 503.3 |

In this example, the ratio of glutamate to ascorbic acid is approximately 1.2 to 1.

EXAMPLE 4

The additive of the present invention may be used for low sodium curing of meats utilizing a sodium-ion-free nitrite-nitrate pickling solution.

| | Grams |
|---|---|
| Ascorbic acid | 174.8 |
| Potassium bicarbonate | 99.3 |
| Mono-potassium glutamate | 740 |
| Total | 1014.1 |

EXAMPLE 5

This is another example for a sodium-free additive.

| | Grams |
|---|---|
| Ascorbic acid | 174.8 |
| Potassium bicarbonate | 99.3 |
| Mono-potassium glutamate | 370 |
| Potassium chloride | 370 |
| Total | 1014.1 |

In this example, the ratio of glutamate and of potassium chloride to ascorbic acid is approximately 2 to 1.

EXAMPLE 6

This is an example of an additive for a cover or pump pickle for corned beef.

| | Grams |
|---|---|
| Ascorbic acid | 94.3 |
| Sodium bicarbonate | 45.1 |
| Mono-sodium glutamate | 740 |
| Total | 879.4 |

The corned beef may be stored or shipped in this pickle.

EXAMPLE 7

This is an example of an additive for 100 pounds of comminuted meats, including ham, beef, pork, etc.

| | Grams |
|---|---|
| Ascorbic acid | 22 |
| Sodium bicarbonate | 10.5 |
| Mono-sodium glutamate | 45 |
| Total | 77.5 |

The weights given in each of Examples 1–6 represent the amounts of each ingredient which is to be added to 100 gallons of conventional pump or cover nitrite-nitrate pickle solution.

In practicing the present invention, the bicarbonate and the ascorbic acid are used in equimolar proportions. The preferred ratio of alkali metal glutamate to ascorbic acid is 1.2–8 parts by weight of the glutamate calculated as mono-sodium glutamate to 1 part of ascorbic acid.

Furthermore, in order to provide the rapid and desirable curing, there is added to 100 gallons of conventional nitrite-nitrate pickling solution 94–189 grams of ascorbic acid, 45–91 grams of alkali metal bicarbonate calculated as sodium bicarbonate, and 224–740 grams of alkali metal glutamate calculated as mono-sodium glutamate. Instead of utilizing mono-sodium glutamate, any other equivalent protein hydrolysate may be used and as used herein glutamate includes such other hydrolysate.

The ratio of glutamate to ascorbic acid in the additive of Example 4 may be expressed as an approximate ratio of 4 to 1; of Example 5 as 2 to 1, and Example 6 as 8 to 1.

Thus, the present invention provides a meat pickling additive comprising ascorbic acid, alkali metal bicarbonate, alkali metal glutamate, the ascorbic acid and alkali metal bicarbonate being in equimolar proportions and the ratio of the glutamate to ascorbic acid being between 1.2–8 parts by weight of the glutamate per part of ascorbic acid, the glutamate being calculated as mono-sodium glutamate.

EXAMPLE 8

The additive of the present invention is preferably made by weighing out the ingredients in the proportions specified in the preceding examples, and reducing the ingredients to a state of fine division by levigating them with acetone at room temperature, not higher than 25° C. This levigation is effected in a shallow glass container with a properly fitted pestle, or upon a ground glass slab with a flat surfaced glass muller. The acetone is used in sufficient amount to make a slurry or paste with the solid ingredients. Motion is imparted to the muller which resembles the figure 8 and is frequently varied with motions of oval loops which intersect each other, the object being to vary the motion so that all of the particles of the composition may be brought under the muller on this slab.

The use of acetone serves three purposes. First, it is used to levigate the composition which is more than just physically mixing the ingredients since the composition created in this mix has a definite comminuted crystalline structure. Secondly, the acetone acts as a dehydrating agent which overcomes the possible auto-hydrolysis of the ascorbic acid-sodium bicarbonate (to form water and carbon dioxide), which is always present in acid-bicarbonate compositions. Third, the acetone keeps the temperature of the composition low during levigation and thereby serves to protect the ascorbic acid which is sensitive to heat.

When a composition is levigated in the herein described manner, and then dissolved in water or pickle composition, it takes a little while for the water to start the reaction between the ingredients. This delayed action is important since a slow reaction is desired between the nitrite-nitrate pickling solution and ascorbate in order to obtain the best and most desirable meat curing results and to prevent a too rapid release of nitric oxide gas.

The levigated composition is then suspended in acetone and spray dried in a vacuum oven at 28" vacuum, at a temperature not exceeding 50° C., with a humidity not exceeding 25%. The dried composition is then compressed in large masses of appropriate weight necessary for the volume of pickling solution to be used with the additive and then packed in a moisture-proof container and stored until ready for use.

EXAMPLE 9

Alternatively, the composition after levigation, as set forth in Example 8 may be dried in a vacuum oven at 28" of vacuum and dried for 3 hours at a temperature not exceeding 50° C. with a humidity not above 25%.

The dried material may be then packed in moisture-proof containers.

The solid massed composition prepared as above is dropped into the total prepared volume of a conventional nitrite-nitrate pickling solution and the massed composition falls to the bottom of the pickling solution. If the dried composition is not in a compacted form, it may be placed in a cloth bag and suspended in the prepared pickling solution. In either procedure the reaction starts in the vicinity of the massed additive and will slowly permeate or diffuse through the entire body of the pickling solution.

In this manner there is obtained the slow reaction which is so advantageous as pointed out previously. The pickling solution is normally maintained at a temperature of about 4° C. and this temperature also serves to maintain carbon dioxide in solution since carbon dioxide is more soluble in cold solutions than in warm solutions.

EXAMPLE 10

100 gallons of an artery pumping and cover pickle solution was prepared using sodium chloride 100 pounds, sodium nitrite 1 pound, sodium nitrate ½ pound, sucrose 7½ pounds and water 791.3 pounds. This composition had a salimeter reading of approximately 40 degrees at 35° F. This is the control or basic pickle composition.

Four 100-gallon pickling solutions were prepared as above. I designates the control pickle. II designates the control pickle with the addition of 740 grams of monosodium glutamate. III designates the control pickle containing an added equimolar physical mixture of ascorbic acid (188.5 grams) and sodium bicarbonate (90.2 grams) so as to create 7½ oz. of sodium ascorbate. IV designates the control pickle to which was added the ingredients set forth in Example 1 in the weights set forth in said example.

IV represents the composition of the present invention. The additive which was added to IV was prepared as set forth above in Example 8. This additive was added as a compacted mass as described above.

When testing each pickling composition, the pumps and conatiners in each case were washed out with clear water between each change of pickle solution to make sure that each treated meat was not contaminated with the previous pickling composition.

36 pieces of equally weighed meat (15 pound ham each) were used. The meats were numbered consecutively from 1 to 36, using numbers 1-9 to designate meats treated with pickle numbered I, numbers 10-18 to designate meats treated with pickle II, numbers 19-27 to designate meats with pickle III, and numbers 28-36 to designate meats treated with pickle IV.

All of the meats were pumped at 12% of the weight of the sample and left in its particular pickling composition for 12 hours.

Then the meats were cooked until done with an internal temperature of 145° F. Respective pieces of meat from each group were chosen at random for analysis. The analyses of all samples were made on the equivalent mixture of lean and fat meat. The results of these analyses are as follows, all of the analyses being based on the cured, cooked meat.

*Table I.—Chemical analyses*

|  | Pickle I (Control)—Meat piece 4 | Pickle II—Meat piece 12 | Pickle III—Meat piece 22 | Pickle IV—Meat piece 29 |
|---|---|---|---|---|
| Total water _____ percent__ | 62.24 | 62.51 | 61.71 | 65.27 |
| Protein _____ do ____ | 12.81 | 14.31 | 11.68 | 16.42 |
| NaCl _____ do ____ | 2.8 | 3.15 | 3.27 | 3.04 |
| Nitrite _____ p.p.m__ | 100 | 94 | 42 | 41 |
| Nitrate _____ p.p.m__ | 67 | 69 | 71 | 72 |
| Sugar _____ percent__ | 0.18 | 0.18 | 0.18 | 0.18 |
| pH _____ | 5.7 | 5.8 | 5.6 | 5.3 |

*Table II.—Organoleptic analyses*

|  | Pickle I—Meat piece 4 | Pickle II—Meat piece 12 | Pickle III—Meat piece 22 | Pickle IV—Meat piece 29 |
|---|---|---|---|---|
| Color | Faded Pink | Light Pink | Pink | Bright pink. |
| Odor | Normal | Normal | Normal | Normal. |
| Taste | Mild | Unusual | Normal | Normal. |
| Texture | Firm | Firm | Firm | Firm. |

Slices of the same meats which were used for the above analyses were subjected to a fluorescent light test simulating conditions encountered in a retail meat market. All of the tests were conducted under refrigeration. Samples of meat were stored in darkness for 3 days at the beginning of the test.

On the fourth, fifth and sixth days meat samples were exposed for 3 hours under fluorescent lights, the illumination of the meat surfaces being 70-foot candles. The samples were then returned to 21 hours of darkness. After storage under these conditions, the samples were rated in order of preference as to color, odor, taste and keeping qualities, and the meat slices from number 29 were rated first, meat slices from number 22 rated second, and meat slices from number 4 were rated third.

EXAMPLE 11

200 gallons of control pickle having the same composition as the control pickle of Example 10 were prepared. To 100 gallons of this control pickle was added an equimolar physical mixture of 188.5 grams ascorbic acid and 90.2 grams sodium bicarbonate. This was designated as pickle V. To the other 100 gallons of control pickle was added a compacted mass of the additive of Example 1 prepared in the manner described in Example 8. This pickle was designated as pickle VI.

Eighteen pieces of equally weighed hams numbered consecutively 1-18 were treated in the manner set forth in Example 10, pieces 1-9 being cured with pickle V and pieces 10-18 being cured with pickle VI. The cured meats were then cooked until done with an internal temperature of 145° F.

Samples of meat from each of pickles V and VI were chosen at random for analysis, all of which analyses were made on lean and fat meat. Meat piece 7 was selected from pickle V and meat piece 16 was selected from pickle VI. The analyses were as follows:

Table III.—Chemical analyses

|  | Pickle containing ascorbic acid-sodium bicarbonate composition: Pickle V—Meat Piece 7 | Pickle containing additive: Pickle VI—Meat Piece 16 |
|---|---|---|
| Water_____percent__ | 61.71 | 65.27 |
| Protein_____do____ | 11.68 | 16.42 |
| NaCl_____do____ | 3.27 | 3.04 |
| Nitrite_____p.p.m__ | 42 | 41 |
| Nitrate_____p.p.m__ | 71 | 72 |
| Sugar_____percent__ | 0.18 | 0.18 |
| pH_____ | 5.6 | 5.3 |

Table IV.—Organoleptic analyses

|  | Pickle V—Meat Piece 7 | Pickle VI—Meat Piece 16 |
|---|---|---|
| Odor | Normal | Unusually pleasing. |
| Taste | Mild | Good. |
| Flavor | Pleasant | Excellent. |

STORAGE RESULTS

Exposed slices of meat processed with each of the pickling solutions were placed in a meat-wholesaler cooler, in a sales cooler, and in a provision storage cooler. Meats cured in accordance with the composition of the present invention (Pickles IV and VI), as herein described, outlasted the others by from 4 to 6 weeks. The longer lasting qualities of meats cured in accordance with the present invention are due to the lower pH of the meats. This lower pH is due to the liberation of carbon dioxide when the additive is dissolved in the pickling solution. This lower pH inhibits the action of meat destructing organisms. Also, the presence of the glutamate is very vital for longer keeping qualities of the meats, which was not exhibited by those meats treated solely with an ascorbic acid-sodium bicarbonate mixture.

As pointed out above, because of the slower rate of reaction of the additive with conventional nitrite-nitrate pickling solutions, the composition of the present invention produces superior results over the use of ascorbic acid or similar compounds alone.

In the above example there was included the composition of a conventional nitrite-nitrate pickling solution for use with hams. However, this nitrite-nitrate composition can be used with bacon and other meats. The additive of the present invention can be used with any other nitrite-nitrate pickling composition for meats and such compositions are well known and conventional in the art.

I claim:

1. A method of curing meat comprising curing meat with a nitrite-nitrate curing solution in the presence of ascorbic acid, alkali metal bicarbonate and alkali metal glutamate, the ascorbic acid and alkali metal bicarbonate being in equimolar proportions.

2. A method of curing meat as recited in claim 1 wherein the ascorbic acid, alkali metal bicarbonate and alkali metal glutamate are suspended as a solid unitary mass in the curing solution, said mass slowly dissolving into the solution as the curing of the meat proceeds.

3. A method of curing meat comprising curing meat with a nitrite-nitrate curing solution in the presence of ascorbic acid, alkali metal bicarbonate and alkali metal glutamate, the ascorbic acid and alkali metal bicarbonate being in equimolar proportions, the glutamate being present in a ratio of about 1.2–8 parts by weight per part of ascorbic acid.

4. A method of curing meat comprising curing meat with a curing solution comprising, per 100 gallons of solution, about 100 pounds sodium chloride, 1 pound sodium nitrite, ½ pound sodium nitrate, 7½ pounds sucrose, 94–189 grams ascorbic acid, 45–91 grams alkali metal bicarbonate, and 224–740 grams of alkali metal glutamate.

5. A method of making a meat pickling additive comprising ascorbic acid, alkali metal bicarbonate and alkali metal glutamate which comprises the steps of comminuting said ingredients in the presence of acetone and drying the resultant finely divided ingredients in a vacuum at a temperature not exceeding 50° C., the ascorbic acid and alkali metal bicarbonate being in equimolar proportions, the glutamate being present in a ratio of 1.2–8 parts by weight per part ascorbic acid.

6. A meat pickling additive comprising ascorbic acid, alkali metal bicarbonate and alkali metal glutamate, the ascorbic acid and the alkali metal bicarbonate being in equimolar proportions, the glutamate being present in a ratio of 1.2–8 parts by weight per part of ascorbic acid.

7. A meat pickling additive comprising about 4 parts by weight of mono-sodium glutamate, 1 part by weight of ascorbic acid, and sodium bicarbonate in an equimolar amount based on the ascorbic acid.

8. A meat pickling additive comprising about 1.2 parts by weight of mono-sodium glutamate, 1 part by weight of ascorbic acid, and sodium bicarbonate in an equimolar amount based on the ascorbic acid.

9. A meat pickling additive comprising about 2 parts by weight of mono-sodium glutamate, 1 part by weight of ascorbic acid, 2 parts by weight of sodium chloride, and sodium bicarbonate in an equimolar amount based on the ascorbic acid.

10. A meat pickling additive comprising about 4 parts by weight of mono-potassium glutamate, 1 part by weight of ascorbic acid, and potassium bicarbonate in an equimolar amount based on the ascorbic acid.

11. A meat pickling additive comprising about 2 parts by weight of mono-potassium glutamate, 1 part by weight of ascorbic acid, 2 parts by weight of potassium chloride, and potassium bicarbonate in an equimolar amount based on the ascorbic acid.

12. A meat pickling additive comprising about 8 parts by weight of mono-sodium glutamate, 1 part by weight of ascorbic acid, and sodium bicarbonate in an equimolar amount based on the ascorbic acid.

13. A nitrite-nitrate pickling composition containing an additive comprising ascorbic acid, alkali metal bicarbonate, and alkali metal glutamate, the ascorbic acid and alkali metal bicarbonate being in equimolar proportions.

14. A nitrite-nitrate pickling composition containing an additive comprising ascorbic acid, alkali metal bicarbonate, and alkali metal glutamate, the ascorbic acid and alkali metal bicarbonate being in equimolar proportions, the glutamate being present in a ratio of about 1.2–8 parts by weight per part of ascorbic acid.

15. A meat pickling composition comprising, per 100 gallons of solution, about 100 pounds sodium chloride, 1 pound sodium nitrite, ½ pound sodium nitrate, 7½ pounds sucrose, 94–189 grams ascorbic acid, 45–91 grams alkali metal bicarbonate, and 224–740 grams of alkali metal glutamate.

References Cited in the file of this patent

UNITED STATES PATENTS

| 2,517,595 | Owens et al. | Aug. 8, 1950 |
| 2,553,533 | Komarik et al. | May 15, 1951 |
| 2,739,899 | Hollenbeck | Mar. 27, 1956 |
| 2,828,212 | Sair | Mar. 25, 1958 |